April 18, 1933.　　　　C. KING　　　　1,903,769
SEED GATHERER FOR MOWING MACHINES
Filed March 22, 1932　　2 Sheets-Sheet 2

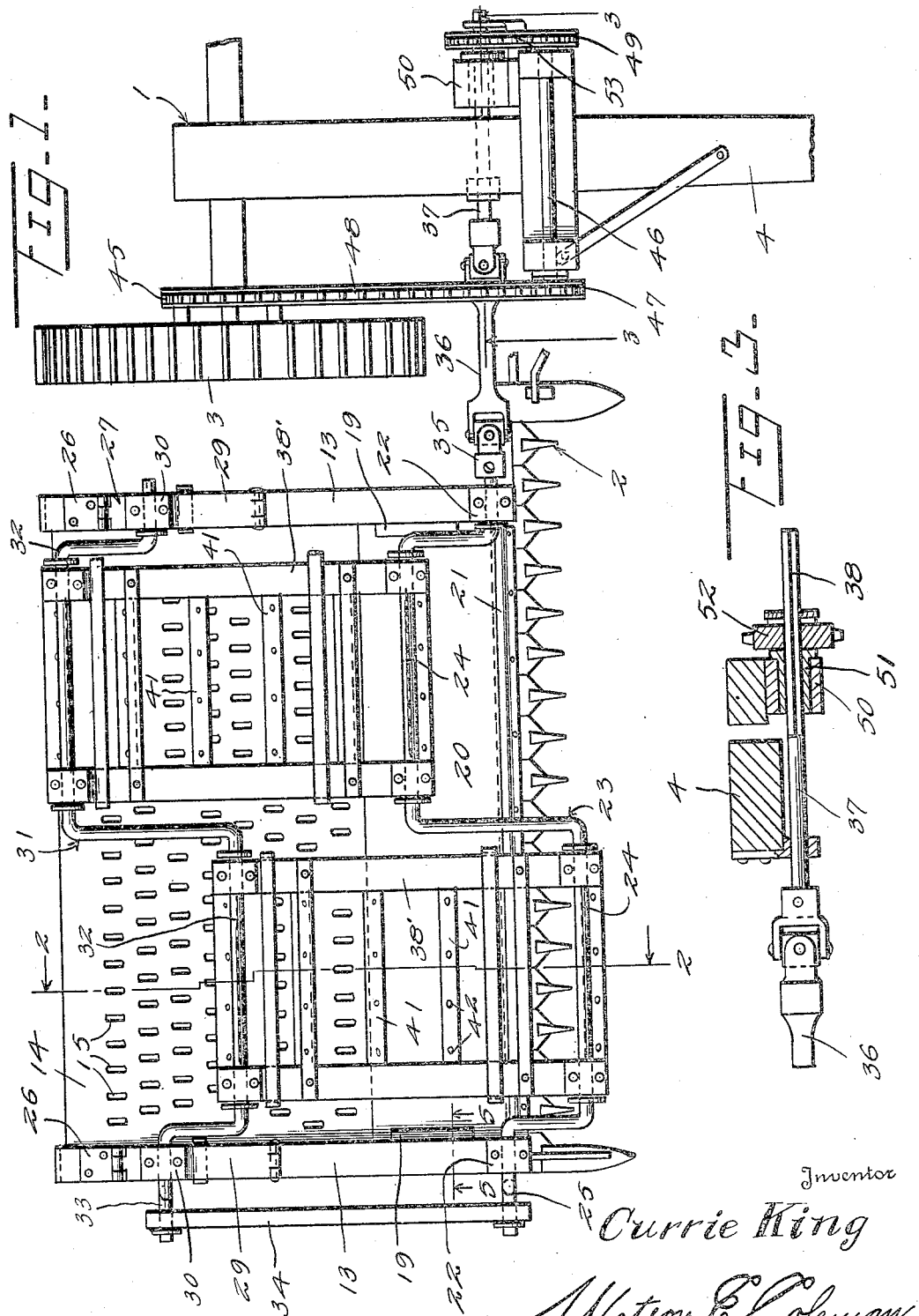

Inventor
Currie King
By Watson E. Coleman
Attorney

Patented Apr. 18, 1933

1,903,769

UNITED STATES PATENT OFFICE

CURRIE KING, OF RUTHERFORD, TENNESSEE

SEED GATHERER FOR MOWING MACHINES

Application filed March 22, 1932. Serial No. 600,488.

This invention relates to improvements in seed gathering attachments for mowing machines and pertains particularly to an attachment employing a beater element which operates over the seed pan.

The primary object of the present invention is to provide a seed gathering attachment having stepping beaters which are so mounted as to be readily raised from normal operative position to facilitate reaching the underlying pan.

Another object of the invention is to provide a seed gathering attachment employing beater elements of a character to adjust themselves to heavy or light hay or grass on the perforated surface of the seed pan.

A still further object of the invention is to provide a novel coupling means between the driving mechanism of the cultivator machine and beater frame carrying cranks which facilitates the movement of the pan and cutter without interfering with the transmission of power from one unit to the other.

A still further object of the invention is to provide a novel means for preventing the loss of seed in the passage of the cut grass from the cutter bar across the opening between the same and the perforated top of the collector pan.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of the mechanism embodying the present invention showing the same coupled with the mowing machine;

Figure 2 is a sectional view on line 2—2 of Figure 1, with the beater frames shifted and showing the sectioned frame at the lowermost point of its travel and illustrating in dotted lines the raised position to which the frames may be shifted;

Figure 3 is a sectional view taken substantially upon the line 3—3 of Figure 1;

Figure 4 is a sectional view taken upon the line 4—4 of Figure 2;

Figure 5 is a sectional view taken on the line 5—5 of Figure 1;

Figure 6 is a fragmentary view of adjacent portions of the seed pan and mower bar looking at the under side thereof and showing the manner of connecting the same together.

Referring now more particularly to the drawings wherein like numerals of reference indicate corresponding parts throughout the several views, the numeral 1 indicates generally a portion of a mower machine to which is attached in the usual manner the cutter bar structure which is indicated as a whole by the numeral 2, one of the wheels of the mowing machine being indicated by the numeral 3 and the draft tongue thereof being indicated by the numeral 4.

The seed gathering device of the present invention comprises a pan which is indicated as a whole by the numeral 5 and which has the bottom wall 6, the back wall 7 and the side walls 8. At the front edge of the bottom 6 is a beam 9 and as shown, the side walls have their top edges inclined from the top of the back wall 7 to the forward edge of the beam 9, thus forming the pan of greatest depth at its rear, and at each side or end of the pan there is formed a runner 10 which slides over the surface of the ground.

At each end of the pan are the upright front and rear posts 11 and 12 respectively which are connected by the inclined rail 13 which is raised above the top of the pan 5. The top of the pan 5 is covered by the plate 14 which is provided with the transversely extending rows of elongated apertures 15, the apertures running or extending from the front to the rear of the pan. The plate 14 is mounted between the side walls 8 of the pan upon the strips 16 secured to the inner faces of the walls and extending upwardly from each end wall 8 is a guard wall 17. A transverse supporting bar 18 extends across the pan bottom 6 beneath the forward edge of the plate 14 at a point rearwardly of the beam 9 and disposed above the strips 16 and forwardly of the forward edge of the plate 14 are guide blocks 19 which are in spaced relation with the strips 16 to receive an end edge of a shiftable plate member 20.

The cutter bar 2 has secured along its top surface the guard strip 21, the rear edge of which is raised from the surface of the cutter bar to receive the forward edge of the shiftable plate member 20. The rear edge of this plate extends over and slidably engages the top surface of the pan plate 14 at its forward edge, as is shown in Figure 2.

Upon each of the rails 13 at its forward end is a bearing block 22 in each of which is rotatably mounted one end of a three-crank crank shaft which is indicated generally by the numeral 23.

Two of the cranks of the shaft 23 which are indicated by the numerals 24 are disposed between the rails 13, while the third crank which is indicated by the numeral 25 is disposed beyond the end of the seed pan which is remote from the machine 1.

Adjacent the rear end of each rail 13 there is secured thereto the end leaf 26 of a triple leaf hinge which is indicated generally by the numeral 27, the intermediate leaf of each hinge being indicated by the numeral 28, while the third or opposite end leaf is indicated by the numeral 29. Each of these hinges 27 folds up upon the top of its supporting rail and when in folded position the secured leaf 26 and intermediate leaf 28 are in alignment on the rail, as illustrated in Figure 2 and the third leaf 29 lies over the intermediate leaf 28. The third leaf 29 of each of the hinges 27 has secured to the face thereof which is uppermost when the hinge is folded, a bearing block 30, and these blocks rotatably support a three-crank crankshaft which is indicated as a whole by the numeral 31 and which like the shaft 23, has the two large cranks, which are indicated by the numerals 32, lying between the rails 13 and the end crank 33 which lies beyond that end of the pan which is remote from the machine 1.

The cranks 25 and 33 are connected by the pitman 34 so that the shafts 23 and 31 will turn in unison and the end of the shaft 23 which is nearest the machine 1 is squared or otherwise suitably formed to receive a collar 35 which forms a part of a double universal joint element 36 which at its opposite end is connected with the shaft 37, a portion of which extending inwardly from the free end thereof, is squared as indicated at 38 and shown in Figure 3.

The adjacent ones of those cranks of the two crank shafts which lie between the rails 13, are connected by the elongated rectangular frames 38' which extend from the front to the rear of the seed collecting device so that as will be readily apparent, as the cranks are turned these frames will be caused to move in circular paths over the top of the seed pan and from the front to the rear thereof when passing through the lower half of the circle. Disposed beneath each of the frames 38' is a rack 39 which is made up of side bars 40 connected by cross bars 41 which have extending from the lower faces thereof, the teeth 42. Each of these racks 39 carries a pair of yokes 43 which loosely surround the overlying frame 38' and each rack 39 is further connected with the overlying frame 38' by a pair of three leaf hinges, each of which is indicated by the numeral 44. As will be readily seen these hinges permit of the free up and down movement of the racks 39 independently of the supporting frames therefor and at the same time allow the racks to maintain a parallel relation to the overlying frame.

As will be readily apparent from the showing of the structure in Figure 2, the teeth 42 of the racks 39 pass over the top of the seed pan in close proximity to the same so that seed carrying grasses cut by the bar 2 will be thoroughly agitated to loosen the seed therefrom.

By the provision of the hinge connection between the crank 31 and the rear ends of the rails 13 the frames 38' and racks carried thereby may be readily lifted to the position indicated by dotted lines in Figure 3 so that ample space is provided beneath the racks for the removal of the seed pan top plate.

For the operation of the frames 38' the machine 1 has attached to the wheel 3, a sprocket wheel or gear 45 and mounted upon the tongue 4 to extend transversely thereof is a shaft 46 on which is a sprocket gear 47 which is connected with the gear 45 by the chain 48 and upon the other end of this shaft is a sprocket gear 49. Upon the under side of the tongue 4 is a bearing 50 in which is a bushing 51 formed to receive the squared portion 38 of the shaft 37 and mounted upon this squared portion 38 of the shaft is a sprocket gear 52 which is connected with the gear 49 by the chain 53.

The forward edge of the seed pan 5 has a pair of hinge elements 54 secured thereto and these elements are connected to similar hinge elements 55 carried by and projecting from the rear of the cutter bar 2, by the rod or pin 56 which extends through the same after they have been brought into alignment. By this means relative movement between the cutter bar 2 and the seed pan 5 is permitted and the opening between the forward edge of the pan and the rear edge of the cutter bar is constantly covered by the slidably mounted plate 20 so that seeds will not be lost by dropping through this opening but will be swept directly onto the pan by the racks 39 as they rotate thereover.

As will also be readily apparent the provision of the sliding shaft 37 permits of slight vertical movement of the seed gatherer when the device is in operation without interfering with the transmission of power from the driving wheel to the beater frames.

Having thus described the invention, what is claimed is:—

1. A seed gathering attachment for a mowing machine having a cutter bar, comprising a pan having a rearwardly upwardly inclined top, means for coupling the pan with the cutter bar, a beater frame, means for rotating said beater frame to pass over the apertured top of the seed pan, hinged supporting means for said beater frame whereby the same may be raised at one end a substantial distance above the seed pan to facilitate removal of the seeds therefrom, and means for establishing a driving connection between the beater frame operating means and a wheel of the mower.

2. A seed gathering attachment for a mowing machine having a cutter bar, comprising a seed pan having an apertured upwardly and rearwardly inclined top, means for hingedly connecting the forward edge of the pan with the back edge of the cutter bar, a beater frame disposed above the apertured top of the pan and in parallel relation thereto, rotatably mounted crank shafts supporting said beater frame for movement in a circular path over the seed pan, means supporting one of said crank shafts whereby the same may be raised vertically from the underlying rear portion of the seed pan, and means for transmitting power from the mower machine to one of the crank shafts.

3. A seed gathering attachment for a mowing machine having a cutter bar, comprising a pan having an apertured inclined top, means for hingedly connecting the pan at the low side of the top with the back of the cutter bar, a pair of crank shafts disposed above said pan and extending longitudinally thereof, a frame carried by the cranks of the shafts and maintained thereby parallel with the top of the seed pan, means for transmitting power from the mower machine to one of said cranks for moving the frame in a circular path over the top of the pan, and a toothed rack carried by said frame and suspended therefrom for up and down movement relative thereto and independently of its movement by the cranks.

4. In a seed gathering attachment for a mowing machine having a cutter bar, a seed receiving pan adapted to be connected to the rear of the cutter bar, rotating elements mounted above said pan for beating out seed onto the top thereof, said rotating elements including a shaft, a shaft rotatably mounted upon the mowing machine and adapted also for longitudinal movement, a universal coupling between said shafts, and means for coupling said last mentioned shaft with a wheel of the mowing machine for transmitting power thereto.

5. In a seed gathering attachment for a mowing machine having a cutter bar, a shaft mounted for rotary and longitudinal movement on the mowing machine, gearing coupling said shaft with a wheel of the mowing machine, a seed gathering pan having an apertured inclined top and disposed rearwardly of the cutter bar, a rotary beater structure mounted on said pan for movement over the apertured top thereof and including a rotary shaft, a universal coupling between said shafts, and a hinge connection between the said pan and the cutter bar permitting relative movement between the pan and bar.

6. A seed gathering attachment for a mowing machine having a cutter bar, comprising a pan having an inclined apertured top, a hinge connection between the pan at the low side of the top and the rear of the cutter bar, a rail mounted at each end of said pan at an elevation above the same and in a plane paralleling the top of the pan, a bearing mounted upon each rail at the end adjacent the low side of the pan, an extensible element mounted upon each rail adjacent the high side of the pan, a bearing carried by each of said extensible elements, a pair of crank members each disposed over the pan and mounted at its ends in a pair of said bearings, a beater frame supported by and between said cranks and disposed in a plane parallel with the top of the seed pan, and means for transmitting power from the mowing machine to one of said cranks for rotating the same and causing the frame to travel in a circular path over the top of the pan, said crank shafts being connected for unitary rotation, and said extensible elements facilitating the raising of that portion of the beater frame overlying the rear of the pan.

7. A seed gathering attachment for mowing machines having a cutter bar, comprising a pan having an inclined apertured top, a hinge connection between the low side of the pan and the back of the cutter bar, a slidable plate overlying the joint between the pan and the cutter bar, a pair of bearings mounted in elevation above the seed pan at the low side thereof, a pair of three leaf hinge members mounted at an elevation above said pan adjacent the high side thereof, a bearing carried by each of said hinge elements to be elevated upon the unfolding of the hinge, a pair of crank shafts extending longitudinally of the pan and each being rotatably mounted in a pair of said bearings, coupling means between said shafts for rotating the same in unison, an elongated frame disposed over and parallel with the top of the pan and suspended from the cranks of said shafts to be moved over the face of the pan upon rotation of the shafts, a tooth carrying rack suspended from said frame and connected therewith for vertical movement, and power transmitting means coupling one of said shafts with the mowing mechanism.

8. In a mowing machine having a cutter bar, a seed pan, hinge means connecting the pan along one edge with the rear of the cutter bar, a top for said pan, said top having a front and a rear portion, said rear portion being apertured to permit seed to pass therethrough into the pan, the front portion of said top being shiftable in a front and rear direction with respect to the pan and further covering the area between the cutter bar and the front of the pan, and means to provide a connection between the cutter bar and said front portion.

9. In a mowing machine having a cutter bar, a seed pan, means connecting the pan along one edge with the rear of said bar whereby movement of the pan independently of the bar is permitted, a perforated top for said pan, and means forming a shield over the area between the said one edge of the pan and the bar to prevent seeds dropping between the pan and the bar.

10. In a mowing machine having a cutter bar, a seed pan, means connecting the pan along one edge with the rear of said bar whereby movement of the pan independently of the bar is permitted, a perforated top for said pan, and a plate overlying the area between the said one edge of the pan and the bar and attached to the bar and slidable over the pan.

11. In a mowing machine having a cutter bar, a pan disposed at the rear of said cutter bar, connecting means between the pan and the bar, a perforated top for said pan, a frame structure mounted over the pan for movement from the front to the rear thereof and in relatively close proximity thereto, a second frame disposed beneath said first frame and having downwardly directed teeth, and means connecting said frames whereby the second mentioned frame is permitted limited up and down movement between the first mentioned frame and the top of the pan.

12. In a mowing machine having a cutter bar, a seed gathering pan disposed rearwardly of said cutter bar, coupling means between the cutter bar and the pan, an apertured top for said seed pan, a beater structure, means supporting said beater structure for movement in an endless path over the top of said pan, said beater structure including a frame having downwardly directed teeth and the said structure when in operation moving said toothed frame in relatively close proximity to and over the top of the pan and from the front to the rear thereof, and means for swinging the rear of said beater structure upwardly and forwardly with respect to the seed pan to facilitate removal of seeds therefrom.

In testimony whereof I hereunto affix my signature.

CURRIE KING.